United States Patent
Zhou et al.

(10) Patent No.: US 11,588,174 B2
(45) Date of Patent: Feb. 21, 2023

(54) SOLID ELECTROLYTE AND PREPARATION METHOD THEREOF, AND ELECTROCHEMICAL DEVICE AND ELECTRONIC DEVICE COMPRISING SOLID ELECTROLYTE

(71) Applicant: NINGDE AMPEREX TECHNOLOGY LIMITED, Ningde (CN)

(72) Inventors: Molin Zhou, Ningde (CN); Leimin Xu, Ningde (CN); Jianming Zheng, Ningde (CN); Jianli Gai, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 234 days.

(21) Appl. No.: 16/443,071

(22) Filed: Jun. 17, 2019

(65) Prior Publication Data
US 2020/0235421 A1    Jul. 23, 2020

(30) Foreign Application Priority Data
Jan. 23, 2019   (CN) .................. 201910063614.7

(51) Int. Cl.
*H01M 10/0562* (2010.01)
*H01M 10/0525* (2010.01)
*C01G 17/00* (2006.01)

(52) U.S. Cl.
CPC ...... *H01M 10/0562* (2013.01); *C01G 17/006* (2013.01); *H01M 10/0525* (2013.01);
(Continued)

(58) Field of Classification Search
CPC .......... H01M 10/0562; H01M 10/056; H01M 10/0561; H01M 10/0525; C01G 17/006
See application file for complete search history.

(56) References Cited

U.S. PATENT DOCUMENTS

| 2013/0040208 A1* | 2/2013 | Kanno | H01M 10/0562 429/321 |
| 2016/0149261 A1* | 5/2016 | Zaghib | H01M 4/382 429/94 |

(Continued)

FOREIGN PATENT DOCUMENTS

| CN | 1937299 A | 3/2007 |
| CN | 1937301 A | 3/2007 |

(Continued)

OTHER PUBLICATIONS

Brant et.al; "A new class of lithium ion conductor with tunable structures and compositions: Quaternary diamond-like thiogermanates"; Available online Jul. 17, 2015 (Year: 2015).*

(Continued)

*Primary Examiner* — Nathanael T Zemui
(74) *Attorney, Agent, or Firm* — Taylor English Duma LLP

(57) ABSTRACT

Embodiments of the present application relate to a solid electrolyte and a preparation method thereof, and an electrochemical device and an electronic device comprising the solid electrolyte. The solid electrolyte comprises a lithium-containing transition metal sulfide being represented by the chemical formula of $Li_{2-2a+b}Cd_{1+a}M_cGe_{1-d}S_4$, where M is selected from the group consisting of Al, Ga, In, Si, Sn and a combination thereof, wherein $0<a\leq0.25$, $0\leq b\leq0.2$, $0\leq c\leq0.2$, and $0\leq d\leq0.2$. The embodiments of the present application effectively improve the shortcomings of poor chemical stability of the conventional thiophosphate solid electrolyte in an atmospheric environment by providing the above solid electrolyte having a thio-LISICON structure and containing no phosphorus (P), so that the solid electrolyte has both good chemical stability and high ionic conductivity, (Continued)

thereby reducing the processing environment requirements and manufacturing cost of the solid electrolyte.

20 Claims, 6 Drawing Sheets

(52) U.S. Cl.
CPC ...... *C01P 2002/52* (2013.01); *C01P 2002/72* (2013.01); *C01P 2006/40* (2013.01); *H01M 2300/0068* (2013.01)

(56) References Cited

U.S. PATENT DOCUMENTS

2017/0040637 A1 2/2017 Ceder et al.
2018/0277901 A1* 9/2018 Mochizuki ........ H01M 10/0585

FOREIGN PATENT DOCUMENTS

CN 103401018 A 11/2013
CN 109761265 A 5/2019

OTHER PUBLICATIONS

"A lithium superionic conductor," by Noriaki Kamaya et al., Nature Materials, vol. 10, Sep. 2011, pp. 682-686.
"Synthesis of a new lithium ionic conductor, thio-LISICON-lithium germanium sulfide system," Ryoji Kanno et al., Solid State Ionics, 130 (2000), pp. 97-104.
"High-power all-solid-state batteries using sulfide superionic conductors," Yuki Kato et al., Nature Energy, vol. 1, Apr. 2016, pp. 1-7.
Chinese Office Action and Search Report dated Jan. 6, 2020, in Chinese counterpart application 201910063614.7, 9 pages in Chinese, 2 pages in English.
"Conductive Performance of Inorganic Crystalline Solid Electrolytes Used in Lithium Ion Batteries," Li Yang et al., Journal of the Chinese Ceramic Society, Jul. 2013, vol. 41, No. 7, pp. 950-958, with English abstract and partial English translations.
PCT International Search Report, dated Mar. 10, 2020 in counterpart PCT application PCT/CN2019/123335, 5 pages.
PCT Written Opinion, dated Mar. 10, 2020 in counterpart PCT application PCT/CN2019/123335, 5 pages.
"Synthesis-of-New-Lithium-Ionic-Conductor-Thio-LISICONFLithium-Silicon-Suldes-System," Murayama et al., Journal at Solid State Chemistry, vol. 168, pp. 140-148 (2002).

* cited by examiner

SOLID ELECTROLYTE AND PREPARATION METHOD THEREOF, AND ELECTROCHEMICAL DEVICE AND ELECTRONIC DEVICE COMPRISING SOLID ELECTROLYTE

CROSS REFERENCE TO RELATED APPLICATIONS

The present application claims the benefit of priority from the China Patent Application No. 201910063614.7, filed on 23 Jan. 2019, the disclosure of which is hereby incorporated by reference in its entirety.

BACKGROUND

1. Field of the Invention

Embodiments of the present application relate to the field of electrochemical devices, and more particularly, to a solid electrolyte and a preparation method thereof.

2. Description of the Related Art

The following description and examples are not to be considered as the prior art by virtue of their inclusion in this section.

Electrochemical devices (for example, lithium-ion batteries) have entered our daily lives with advances in technology and higher environmental protection requirements. However, the conventional lithium-ion battery needs to use a flammable organic solvent as an electrolytic solution, so there is a great potential safety hazard. In particular, in order to meet the high energy performance requirements of an electronic device for the electrochemical device, the energy density of the electrochemical device is increasingly higher, and incidents of safety risks are becoming ever more prominent. Therefore, it is particularly important to develop electrochemical devices with better safety performance.

In order to solve the above safety problems, the introduction of solid electrolytes instead of organic electrolytic solutions is one feasible solution. However, the conventional solid electrolyte still has the problems of low ionic conductivity and inadequate chemical stability. Therefore, it is necessary to further improve the traditional solid electrolyte to obtain a solid electrolyte having both high ionic conductivity and good chemical stability.

SUMMARY

In view of the problems in the background art, the present application is directed to a solid electrolyte having optimized chemical stability in an atmospheric environment and high ionic conductivity and an electrochemical device assembled therewith.

Some embodiments of the present application provide a solid electrolyte, comprising a lithium-containing transition metal sulfide represented by the chemical formula of $Li_{2-2a+b}Cd_{1+a}M_cGe_{1-d}S_4$, where M is selected from the group consisting of Al, Ga, In, Si, Sn and a combination thereof, wherein $0<a\leq0.25$, $0\leq b\leq0.2$, $0\leq c\leq0.2$, and $0\leq d\leq0.2$.

According to some embodiments of the present application, the lithium-containing transition metal sulfide belongs to an orthorhombic system.

According to some embodiments of the present application, the lithium-containing transition metal sulfide has a thio-LISICON crystal structure.

According to some embodiments of the present application, the basic constituent unit of the thio-LISICON crystal structure comprises tetrahedral structural units of $LiS_4$, $CdS_4$, $MS_4$ and $GeS_4$.

According to some embodiments of the present application, the solid electrolyte further comprises a binder and a lithium salt, where the binder is selected from the group consisting of polyvinylidene fluoride, a vinylidene fluoride-hexafluoropropylene copolymer, polyamide, polyacrylonitrile, polyacrylate ester, polyacrylic acid, polyacrylate salt, sodium carboxymethyl cellulose, polyvinylpyrrolidone, polyvinyl ether, polymethyl methacrylate, polytetrafluoroethylene, polyhexafluoropropylene, styrene-butadiene rubber and a combination thereof, and the lithium salt is selected from the group consisting of lithium perchlorate ($LiClO_4$), lithium hexafluorophosphate ($LiPF_6$), lithium hexafluoroarsenate ($LiAsF_6$), lithium tetrafluoroborate ($LiBF_4$), lithium tetraphenylborate ($LiB(C_6H_5)_4$), lithium methanesulfonate ($LiCH_3SO_3$), lithium trifluoromethanesulfonate ($LiCF_3SO_3$), lithium bis(trifluoromethylsulfonyl)imide ($LiN(SO_2CF_3)_2$), lithium tris(trifluoromethanesulfonyl)methide ($LiC(SO_2CF_3)_3$), lithium hexafluorosilicate ($LiSiF_6$), lithium bis(oxalate)borate (LiBOB), lithium difluoroborate ($LiF_2OB$) and a combination thereof.

According to some embodiments of the present application, the ionic conductivity of the lithium-containing transition metal sulfide is about $10^{-6}$ S/cm to about $10^{-4}$ S/cm.

Some embodiments of the present application provide a method for preparing a solid electrolyte, comprising the following steps: mixing a Li-containing material, a Cd-containing material, an M-containing material, a Ge-containing material and an S-containing material according to a stoichiometric ratio of $Li_{2-2a+b}Cd_{1+a}M_cGe_{1-d}S_4$ to form a mixture, where M is selected from the group consisting of Al, Ga, In, Si, Sn and combinations thereof, wherein $0<a\leq0.25$, $0\leq b\leq0.2$, $0\leq c\leq0.2$, and $0\leq d\leq0.2$; heating the mixture to a solid phase reaction critical temperature, and then cooling to room temperature to obtain a lithium-containing transition metal sulfide; and forming the solid electrolyte using the lithium-containing transition metal sulfide.

According to some embodiments of the present application, the step of heating the mixture to a solid phase reaction critical temperature comprises heating the mixture from about 600° C. to about 1000° C.

According to some embodiments of the present application, the step of forming the solid electrolyte using the lithium-containing transition metal sulfide comprises: placing the lithium-containing transition metal sulfide in a cold pressing mold; and cold-pressing the lithium-containing transition metal sulfide to form the solid electrolyte.

According to some embodiments of the present application, the step of cold-pressing the lithium-containing transition metal sulfide comprises cold-pressing the lithium-containing transition metal sulfide under a pressure of about 100 MPa to about 400 MPa.

According to some embodiments of the present application, the step of forming the solid electrolyte using the lithium-containing transition metal sulfide comprises: adding a binder into a solvent to prepare a solution, where the binder is selected from the group consisting of polyvinylidene fluoride, a vinylidene fluoride-hexafluoropropylene copolymer, polyamide, polyacrylonitrile, polyacrylate ester, polyacrylic acid, polyacrylate salt, sodium carboxymethyl cellulose, polyvinylpyrrolidone, polyvinyl ether, polymethyl methacrylate, polytetrafluoroethylene, polyhexafluoropropylene, styrene-butadiene rubber and a combination thereof;

adding the lithium-containing transition metal sulfide and a lithium salt into the solution, and stirring uniformly to form mixed slurry, where the lithium salt is selected from the group consisting of lithium perchlorate ($LiClO_4$), lithium hexafluorophosphate ($LiPF_6$), lithium hexafluoroarsenate ($LiAsF_6$), lithium tetrafluoroborate ($LiBF_4$), lithium tetraphenylborate ($LiB(C_6H_5)_4$), lithium methanesulfonate ($LiCH_3SO_3$), lithium trifluoromethanesulfonate ($LiCF_3SO_3$), lithium bis(trifluoromethylsulfonyl)imide ($LiN(SO_2CF_3)_2$), lithium tris(trifluoromethanesulfonyl)methide ($LiC(SO_2CF_3)_3$), lithium hexafluorosilicate ($LiSiF_6$), lithium bis(oxalate)borate (LiBOB), lithium difluoroborate ($LiF_2OB$) and a combination thereof; and applying the mixed slurry onto a substrate, and then drying the mixed slurry to form the solid electrolyte.

Some embodiments of the present application provide an electrochemical device, comprising: a cathode, an anode and the solid electrolyte according to the above embodiments.

Some embodiments of the present application provide an electronic device, comprising the above electrochemical device.

The embodiments of the present application improve the lithium-containing phosphorus sulfide having a thio-LISICON structure in the prior art to obtain a lithium-containing transition metal sulfide having a thio-LISICON structure and containing no phosphorus (P), and the lithium-containing transition metal sulfide does not have a water-sensitive phosphorus-sulfur group ($P_xS_y$), and has good chemical stability in an atmospheric environment and also has good thermal stability and certain ionic conductivity. Therefore, the above lithium-containing transition metal sulfide effectively enhances the chemical stability and safety of the conventional thiophosphate solid electrolyte, thereby reducing demands on the processing environment, and further reducing the assembly cost of the electrochemical device.

BRIEF DESCRIPTION OF THE DRAWINGS

The drawings that are necessary to describe the embodiments of the present application or the prior art will be briefly described below to facilitate the description of the embodiments of the present application. The drawings in the following description are only some embodiments of the present application.

DETAILED DESCRIPTION

Figure 1:
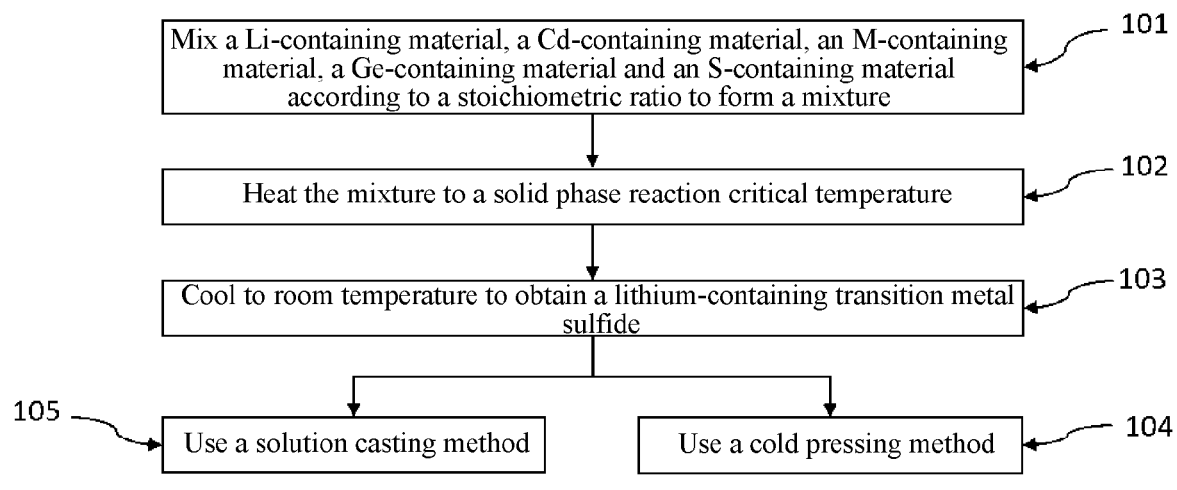
FIG. 1 is a flow chart of a preparation method of a solid electrolyte according to some embodiments of the present application.
Figure 2:
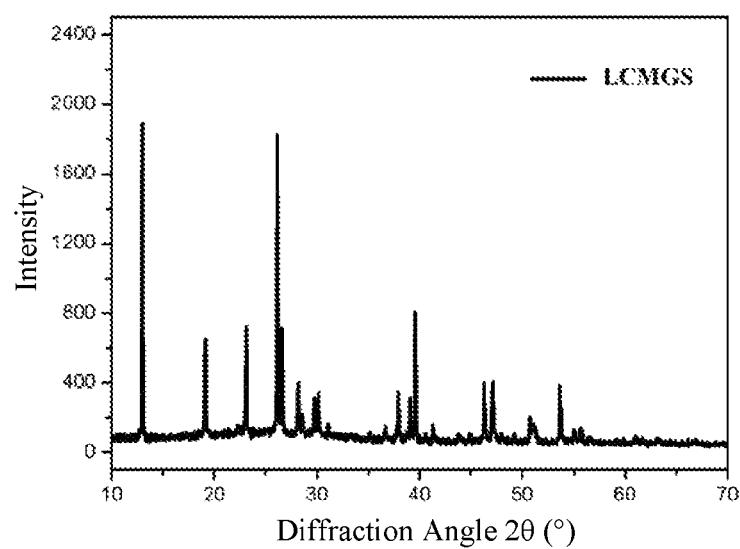
FIG. 2 is an X-ray diffraction pattern of a lithium-containing transition metal sulfide (LCMGS) in Embodiment 1 of the present application.
Figure 3:
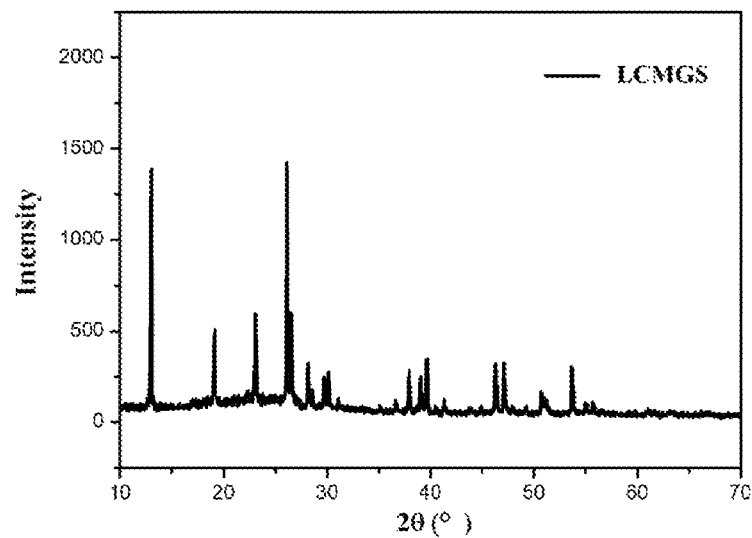
FIG. 3 is an X-ray diffraction pattern of a lithium-containing transition metal sulfide (LCMGS) in Embodiment 2 of the present application.
Figure 4:
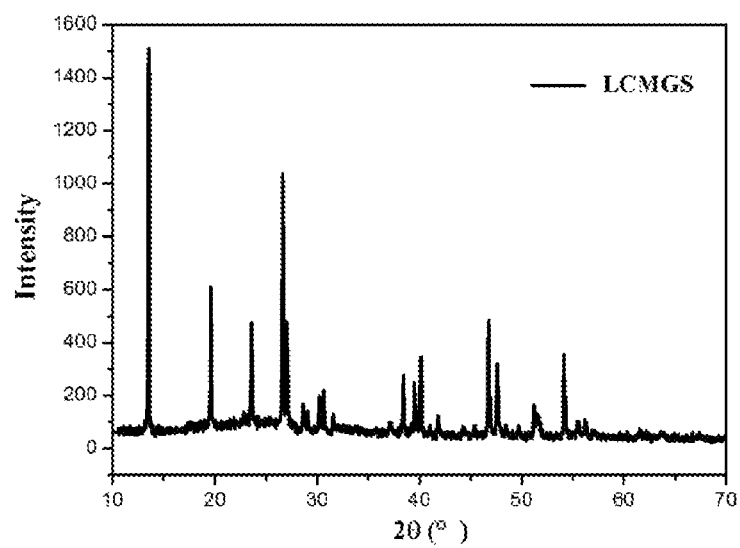
FIG. 4 is an X-ray diffraction pattern of a lithium-containing transition metal sulfide (LCMGS) in Embodiment 3 of the present application.
Figure 5:
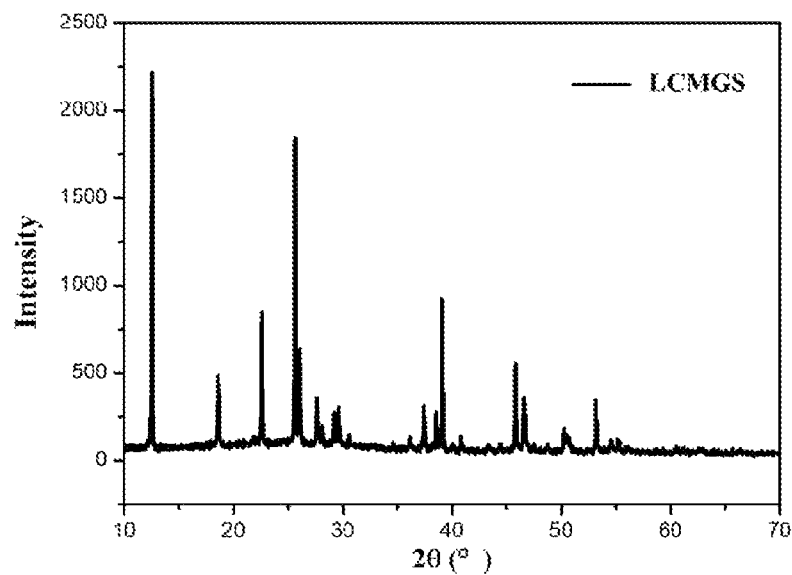
FIG. 5 is an X-ray diffraction pattern of a lithium-containing transition metal sulfide (LCMGS) in Embodiment 4 of the present application.

In order to make the objects, technical solutions and advantages of the present application more understandable, the technical solutions in the embodiments of the present application will be clearly and comprehensively described in the following with reference to the embodiments of the present application. It is apparent that the described embodiments are some of the embodiments of the present application, rather than all of the embodiments. All other embodiments obtained by those skilled in the art based on the technical solutions provided by the present application and the given embodiments and without the creative work are all within the protection scope of the present application.

In specific embodiments and claims of the present application, a list of items joined by the term "one of" may mean any one of the listed items. For example, if items A and B are listed, then the phrase "one of A and B" means only A or only B. In another example, if items A, B, and C are listed, then the phrase "one of A, B and C" means only A; only B; or only C. The item A may comprise a single component or multiple components. The item B may comprise a single component or multiple components. The item C may comprise a single component or multiple components.

In specific embodiments and claims of the present application, a list of items connected by the term "at least one of" may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may comprise a single component or multiple components. The item B may comprise a single component or multiple components. The item C may comprise a single component or multiple components.

In addition, amounts, ratios, and other numerical values are sometimes presented herein in a range format. It should be understood that such range formats are for convenience and brevity, should be interpreted with flexibility, and not only comprise those numerical values that are specifically designated as range limitations, but also comprise all individual numerical values or sub-ranges that are within the range, as each value and sub-range is specified explicitly.

Further, for convenience of description, "first", "second", "third" and the like may be used herein to distinguish different components of one drawing or series of drawings. Unless otherwise specified or limited, "first", "second", "third" and the like are not intended to describe the corresponding components.

In specific embodiments and claims of the present application, the terms "approximately", "generally", "substantially" and "about" are used to describe and explain minor changes. When used in conjunction with an event or situation, the terms may refer to examples where the event or situation occurs exactly and examples where the event or situation occurs very closely. For example, when used in conjunction with a numerical value, the terms may refer to a variation range that is less than or equal to ±10% of the numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, amounts, ratios, and other numerical values are sometimes presented herein in a range format. It should be understood that such range formats are for convenience and brevity, should be interpreted with flexibility, and not only comprise those numerical values that are specifically designated as range limitations, but also comprise all individual numerical values or sub-ranges that are within the range, as each value and sub-range is specified explicitly.

Since the solid electrolyte has characteristics of being non-flammable, non-corrosive, non-volatile, and free from liquid leakage problems, the all-solid-state electrochemical device prepared by using the solid electrolyte is extremely safe. At the same time, the all-solid-state electrochemical device has the advantages of long service life, high theoretical energy density and the like. In an electrochemical device using an organic electrolytic solution (such as a lithium-ion battery), the organic electrolytic solution repeatedly generates and destroys a solid-electrolyte interface (SEI) film during each charge-discharge cycle, resulting in a rapid decline in the capacity of the electrochemical device, which in turn seriously affects the service life of the electrochemical device. However, the solid electrolyte completely solves this problem. Furthermore, the solid electrolyte generally has good mechanical strength and can effectively resist the puncturing by lithium dendrites, and thus, can also improve the charge-discharge cycle performance and service life of the electrochemical device. In addition, since the solid electrolyte generally has a wide electrochemical window, the solid electrolyte can match cathode materials with high electrical potential, and the all-solid-state electrochemical device can simplify a thermal management system of the electrochemical device, so that the energy density thereof is greatly improved.

In recent years, there have been a lot of research and improvements with solid electrolytes. Common solid electrolytes generally fall into three categories: polymer type, oxide type, and sulfide type. The polymer type solid electrolytes comprise polyethylene oxide (PEO) based, polyphenyl ether (PPO) based, polyacrylonitrile (PAN) based, polymethyl methacrylate (PMMA) based, polyvinylidene fluoride (PVDF) based and the like, and such electrolytes have light weight, good viscoelasticity and excellent machinability, but have low ionic conductivity and poor rate capability. The oxide type solid electrolytes comprise, by crystal structure, a Perovskite type (e.g., $Li_{0.5}La_{0.5}TiO_3$), an Anti-Perovskite type (e.g., $Li_3OCl$), a NASICON type (e.g., $Li_{1-x}Al_xTi_{2-x}(PO_4)_3$, $0 \leq x \leq 0.4$) and a Garnet type (e.g., $Li_7La_3Zr_2O_{12}$), etc., and such electrolytes have good chemical stability and can exist stably in the atmosphere, but have poor compatibility with cathode and anode materials. The sulfide type solid electrolytes generally have high ionic conductivity, low grain boundary resistance and good machining property. In 1999, Kanno et al. used sulfur instead of oxygen in LISICON to obtain a crystalline solid electrolyte having a thio-LISICON structure, which has attracted worldwide attention (Kanno et al., "Synthesis of a new lithium ionic conductor, thio-LISICON-lithium germanium sulfide system", 2000, Solid State Ion, Volume 130, Pages 97-104). Subsequently, Kamaya et al. disclosed a phosphorus sulfide crystalline electrolyte $Li_{10}GeP_2S_{12}$ (LGPS) having lithium ion three-dimensional diffusion channels (Kamaya et al., "A lithium superionic conductor", 2011, Nature Materials, Volume 10, Pages 682-686), and its room-temperature conductivity reaches $1.2 \times 10^{-2}$ S/cm. In addition, Kato et al. developed a novel phosphorus sulfide crystalline electrolyte $Li_{9.54}Si_{1.74}P_{1.44}S_{11.7}Cl_{0.3}$ (Kato et al., "High-power all-solid-state batteries using sulfide superionic conductors", 2016, Nature Energy, Volume 1:16030), and the material has the ionic conductivity of $2.5 \times 10^{-2}$ S/cm at 27° C., which is twice that of LGPS and even exceeds the ionic conductivity of common carbonate electrolytic solutions. However, sulfur-phosphorus compounds are generally very sensitive to moisture. When stored in air, they easily absorb water and produce a gas such as $H_2S$ with a foul odor, which not only increases the demands on the processing environment, but also increases the processing cost. At the same time, since their decomposition products comprise toxic gases such as $H_2S$, the potential risks to the environment and processing personnel are increased. In order to solve the above problems, the present application provides some novel sulfide solid electrolytes having a thio-LISICON structure and good chemical stability at the same time to reduce the processing environment requirement and manufacturing cost of the solid electrolyte and also improve the safety of the solid electrolyte.

The above non-patent documents "Synthesis of a new lithium ionic conductor, thio-LISICON-lithium germanium sulfide system, Kanno et al., 2000", "A lithium superionic conductor, Kamaya et al., 2011" and "High-power all-solid-state batteries using sulfide superionic conductors, Kato et al., 2016" exemplify an exemplary illustration of the thio-LISICON crystal structure of several solid electrolytes of the present application, which is herein incorporated by reference in its entirety.

The embodiments of the present application provide a novel solid electrolyte, comprising a lithium-containing transition metal sulfide $Li_{2-2a+b}Cd_{1+a}M_cGe_{1-d}S_4$ (LCMGS), where M is selected from the group consisting of aluminum (Al), gallium (Ga), indium (In), silicon (Si), tin (Sn) and a combination thereof, wherein $0 < a \leq 0.25$, $0 \leq b \leq 0.2$, $0 \leq c \leq 0.2$, and $0 \leq d \leq 0.2$.

In some embodiments of the present application, the lithium-containing transition metal sulfide has a thio-LISICON type crystal structure, where the thio-LISICON type crystal structure has a multi-dimensional lithium ion transport channel, a low $Li^+$ migration barrier and large ionic conductivity. In addition, the lithium-containing transition metal sulfide has good chemical stability, does not cause significant changes in its crystal structure when placed in a normal atmospheric environment for a long time, and has good thermal stability and certain ionic conductivity.

In some embodiments of the present application, the crystal structure of the lithium-containing transition metal sulfide belongs to an orthorhombic system.

In some embodiments of the present application, the basic constituent unit of the crystal structure of the lithium-containing transition metal sulfide comprises tetrahedral structural units of $LiS_4$, $CdS_4$, $MS_4$ and $GeS_4$, and groups are densely arranged in the crystal structure and can effectively resist the erosion of external water molecules.

In some embodiments of the present application, the ionic conductivity of the lithium-containing transition metal sulfide is about $10^{-6}$ S/cm to about $10^{-4}$ S/cm.

According to some embodiments of the present application, based on different preparation methods, the solid electrolyte can further comprise a binder and a lithium salt. In some embodiments of the present application, the binder is at least one of polyvinylidene fluoride, a vinylidene fluoride-hexafluoropropylene copolymer, polyamide, polyacrylonitrile, polyacrylate ester, polyacrylic acid, polyacrylate salt, sodium carboxymethyl cellulose, polyvinylpyrrolidone, polyvinyl ether, polymethyl methacrylate, polytetrafluoroethylene, polyhexafluoropropylene and styrene-butadiene rubber. In some embodiments of the present application, the lithium salt is at least one of lithium perchlorate (LiClO$_4$), lithium hexafluorophosphate (LiPF$_6$), lithium hexafluoroarsenate (LiAsF$_6$), lithium tetrafluoroborate (LiBF$_4$), lithium tetraphenylborate (LiB(C$_6$H$_5$)$_4$), lithium methanesulfonate (LiCH3SO3), lithium trifluoromethanesulfonate (LiCF$_3$SO$_3$), lithium bis(trifluoromethylsulfonyl)imide (LiN(SO$_2$CF$_3$)$_2$), lithium tris(trifluoromethanesulfonyl)methide (LiC(SO$_2$CF$_3$)$_3$), lithium hexafluorosilicate (LiSiF$_6$), lithium bis(oxalate)borate (LiBOB) and lithium difluoroborate (LiF$_2$OB).

The preparation method of the solid electrolyte provided by the present application will be described below with reference to FIG. 1. FIG. 1 is a flow chart of a preparation method of a solid electrolyte according to some embodiments of the present application.

As shown in FIG. 1, according to some embodiments of the present application, the preparation method of the solid electrolyte adopts a high temperature solid phase method, which comprises the following steps: Step 101: a lithium (Li)-containing material, a cadmium (Cd)-containing material, an M-containing material, a germanium (Ge)-containing material and a sulfur (S)-containing material for forming a lithium-containing transition metal sulfide (LCMGS) are mixed according to a stoichiometric ratio of Li$_{2-2a+b}$Cd$_{1+a}$M$_c$Ge$_{1-d}$S$_4$ in an inert gas environment to form a mixture, where M is selected from the group consisting of aluminum (Al), gallium (Ga), indium (In), silicon (Si), tin (Sn) and a combination thereof, wherein 0<a≤0.25, 0≤b≤0.2, 0≤c≤0.2, and 0≤d≤0.2. In some embodiments of the present application, the lithium (Li)-containing material, the cadmium (Cd)-containing material, the M-containing material, the germanium (Ge)-containing material and the sulfur (S)-containing material may be elemental materials, for example, but not limited to, lithium metal or cadmium materials, or binary materials, for example, but not limited to, lithium sulfide (Li$_2$S), cadmium sulfide (CdS), digallium trisulfide (Ga$_2$S$_3$), and germanium sulfide (GeS) or germanium disulfide (GeS$_2$).

Step 102: the mixture formed in step 101 is placed in a vacuum quartz tube such that the pressure in the quartz tube is about 10$^{-5}$ Pa to about 10$^{-3}$ Pa, then the mixture is heated in a heater at a heating rate of about 0.1° C./min to about 10° C./min to a sintering temperature of about 600° C. to about 1000° C. such that the mixture reaches a solid phase reaction critical temperature, and the sintering temperature is held for about 24 hours to about 96 hours. In other embodiments of the present application, the heating rate is about 1° C./min to about 5° C./min. In other embodiments of the present application, the sintering temperature comprises about 700° C., about 800° C. and about 900° C.

Step 103: the mixture at a high temperature in step 102 is slowly cooled to room temperature at a cooling rate of about 1° C./h to about 10° C./h to obtain a lithium-containing transition metal sulfide (LCMGS).

After the lithium-containing transition metal sulfide (LCMGS) of the present application is formed in step 103, the lithium-containing transition metal sulfide (LCMGS) may form a solid electrolyte by using a cold pressing method (step 104) or a solution casting method (step 105).

In some embodiments of the present application, in step 104, the lithium-containing transition metal sulfide is formed into a solid electrolyte by the cold pressing method, further comprising the following steps: placing the lithium-containing transition metal sulfide formed in step 103 in a cold pressing mold, and cold-pressing under a cold pressing pressure of about 100 MPa to about 400 MPa to obtain the solid electrolyte.

In some embodiments of the present application, the thickness of the solid electrolyte obtained by the cold pressing method is about 100 μm to about 1000 μm.

In some embodiments of the present application, in step 105, the lithium-containing transition metal sulfide is formed into a solid electrolyte by the solution casting method, further comprising the following steps: adding a binder into a solvent to prepare a solution; then, adding the lithium-containing transition metal sulfide formed in step 103 and a lithium salt into the solution, and carrying out stirring and ultrasonic dispersion to obtain mixed slurry that is uniformly mixed; and finally, uniformly applying the mixed slurry onto a flat plate, and carrying out two-stage drying to obtain the solid electrolyte.

In some embodiments of the present application, the step of adding a binder into a solvent to prepare a solution further comprises: preparing the binder and the solution into a solution according to a mass ratio of about 1:10 to about 1:20.

In some embodiments of the present application, the two-stage drying comprises: drying the mixed slurry at about 30° C. to about 60° C. for about 12 to 24 hours, and then carrying out vacuum drying at about 50° C. to about 60° C. for about 12 to 24 hours.

In some embodiments of the present application, the solvent comprises, but not limited to, an N-methylpyrrolidone (NMP) solvent.

In some embodiments of the present application, the binder is at least one of polyvinylidene fluoride, a vinylidene fluoride-hexafluoropropylene copolymer, polyamide, polyacrylonitrile, polyacrylate ester, polyacrylic acid, polyacrylate salt, sodium carboxymethyl cellulose, polyvinylpyrrolidone, polyvinyl ether, polymethyl methacrylate, polytetrafluoroethylene, polyhexafluoropropylene and styrene-butadiene rubber.

In some embodiments of the present application, the lithium salt is at least one of lithium perchlorate (LiClO$_4$), lithium hexafluorophosphate (LiPF$_6$), lithium hexafluoroarsenate (LiAsF$_6$), lithium tetrafluoroborate (LiBF$_4$), lithium tetraphenylborate (LiB(C$_6$H$_5$)$_4$), lithium methanesulfonate (LiCH$_3$SO$_3$), lithium trifluoromethanesulfonate (LiCF$_3$SO$_3$), lithium bis(trifluoromethylsulfonyl)imide (LiN(SO$_2$CF$_3$)$_2$), lithium tris(trifluoromethanesulfonyl)methide (LiC(SO$_2$CF$_3$)$_3$), lithium hexafluorosilicate (LiSiF$_6$), lithium bis(oxalate)borate (LiBOB) and lithium difluoroborate (LiF$_2$OB).

In some embodiments of the present application, the thickness of the solid electrolyte obtained by the solution casting method is about 50 μm to about 150 μm.

In some embodiments of the present application, the content of the lithium-containing transition metal sulfide in the solid electrolyte is about 60% to about 80% based on the total mass of the solid electrolyte; the content of the binder in the solid electrolyte is about 5% to about 10% based on the total mass of the solid electrolyte; and the content of the lithium salt in the solid electrolyte is about 10% to about 35% based on the total mass of the solid electrolyte.

It will be understood by those skilled in the art that although step 101 to step 103 in FIG. 1 are used to synthesize the lithium-containing transition metal sulfide (LCMGS) by a high temperature solid phase method, they are merely exemplary embodiments for illustrating the preparation method of the solid electrolyte according to some embodiments of the present application. Those skilled in the art can adopt any suitable chemical synthesis method in the art according to actual implementation needs without limitation. For example, the preparation method of the lithium-containing transition metal sulfide (LCMGS) according to some embodiments of the present application further comprises, but not limited to, a melt quenching method or a high energy ball milling method.

In some embodiments of the present application, the steps of using the melt quenching method and the high temperature solid phase synthesis to prepare the lithium-containing transition metal sulfide (LCMGS) are generally the same. The difference is that in the melt quenching method, in step 102, the sintering temperature is about 900 to 1000° C., and in step 103, a cooling strategy used is to take out the quartz tube and quench it to room temperature in a cold water bath.

In some embodiments of the present application, the steps of using the high energy ball milling method and the high temperature solid phase synthesis method to prepare the lithium-containing transition metal sulfide (LCMGS) are generally the same. The difference is that in the high energy ball milling method, in step 101, the lithium (Li)-containing material, cadmium (Cd)-containing material, the M-containing material, the germanium (Ge)-containing material and the sulfur (S)-containing material for forming the lithium-containing transition metal sulfide (LCMGS) are ground by high-energy balls and mixed according to the stoichiometric ratio of $Li_{2-2a+b}Cd_{1+a}M_cGe_{1-d}S_4$ to form the mixture.

Some embodiments of the present application provide an electrochemical device, comprising a cathode; an anode; and the solid electrolyte of the above embodiments.

In some embodiments of the present application, the cathode comprises the solid electrolyte, cathode active materials and a conductive agent.

In some embodiments of the present application, the content of the solid electrolyte in the cathode is about 30% to about 40% based on the total mass of the cathode; the content of the cathode active material in the cathode is about 40% to about 60% based on the total mass of the cathode; and the content of the conductive agent in the cathode is about 10% to about 20% based on the total mass of the cathode.

In some embodiments of the present application, examples of the cathode active materials may comprise at least one of lithium cobalt oxide, lithium iron phosphate, lithium manganese iron phosphate, sodium iron phosphate, lithium vanadium phosphate, sodium vanadium phosphate, oxylithium vanadium phosphate, oxysodium vanadium phosphate, lithium vanadate, lithium manganate, lithium nickelate, lithium nickel cobalt manganese oxide, a lithium-rich manganese-based material, lithium nickel cobalt aluminum oxide and lithium titanate.

In the above cathode active materials, the chemical formula of the lithium cobalt oxide may be $Li_xCo_eM_1{}_fO_{2-g}$, where $M_1$ is at least one of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr) and silicon (Si), and the values of x, e, f and g are respectively in the following ranges: $0.8 \le x \le 1.2$, $0.8 \le e \le 1$, $0 \le f \le 0.2$, and $-0.1 \le g \le 0.2$;

In the above cathode active materials, the chemical formula of the lithium nickelate may be $Li_yNi_hM_{2i}O_{2-j}$, where $M_2$ is at least one of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr) and silicon (Si), and the values of y, h, i and j are respectively in the following ranges: $0.8 \le y \le 1.2$, $0.3 \le h \le 0.98$, $0.02 \le i \le 0.7$, and $-0.1 \le j \le 0.2$;

In the above cathode active materials, the chemical formula of the lithium manganate is $Li_zMn_{2-k}M_{3k}O_{4-l}$, where $M_3$ is at least one of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W), and the values of z, h and 1 are respectively in the following ranges: $0.8 \le z \le 1.2$, $0 \le k \le 1.0$ and $-0.2 \le l \le 0.2$.

In the above cathode active material, the chemical formula of the lithium nickel cobalt manganese oxide is $LiNi_mCo_nMn_oO_2$, where the values of m, n and o are respectively in the following ranges: $0<m<1.0$, $0<n<1.0$ and $0<o<1.0$, and $m+n+o=1$.

In some embodiments of the present application, the conductive agent comprises at least one of conductive carbon black, carbon fibers, acetylene black, Ketjen black, graphene and carbon nanotubes.

In some embodiments of the present application, the anode may be, but not limited to, metal lithium foil.

In some embodiments of the present application, the anode further comprises anode materials capable of absorbing and releasing lithium (Li) (hereinafter, sometimes referred to as "anode materials capable of absorbing/releasing lithium (Li)"). Examples of the anode materials capable of absorbing/releasing lithium (Li) may comprise carbon materials, metal compounds, oxides, sulfides, nitrides of lithium such as $LiN_3$, lithium metal, metals forming alloys together with lithium, and polymer materials.

Examples of the carbon material may comprise low graphitized carbon, easily graphitized carbon, artificial graphite, natural graphite, mesophase carbon microspheres, soft carbon, hard carbon, pyrolytic carbon, coke, vitreous carbon, organic polymer compound sintered bodies, carbon fibers and activated carbon. The coke may comprise pitch coke, needle coke and petroleum coke. The organic polymer compound sintered body refers to a material obtained by calcining a polymer material such as a phenol plastic or a furan resin at a suitable temperature to carbonize it, and some of these materials are classified into low graphitized carbon or easily graphitized carbon. Examples of the polymer material may comprise polyacetylene and polypyrrole.

Further, the anode materials capable of absorbing/releasing lithium (Li) may comprise elemental lithium metal, metal elements and semimetal elements capable of forming alloys together with lithium (Li), alloys and compounds comprising such elements, and the like. For example, they are used together with carbon materials since the good cycle performance and high energy density can be obtained in this case. In addition to the alloys comprising two or more metal elements, the alloys used herein also comprise alloys containing one or more metal elements and one or more semimetal elements. The alloy may be in the form of a solid solution, a eutectic crystal (eutectic mixture), an intermetallic compound, and a mixture thereof.

Examples of the metal elements and the semimetal elements may comprise tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). Examples of the above alloys and compounds may comprise a material having the chemical formula: $Ma_sMb_tLi_u$, and a material having the chemical formula: $Ma_pMc_qMd_r$. In these chemical formulae, Ma represents at least one of metal elements and semimetal elements capable of forming an alloy together with lithium; Mb represents at least one of metal elements and semimetal elements other than lithium and Ma; Mc represents at least one of the non-metal elements; Md represents at least one of metal elements and semimetal elements other than Ma; and s, t, u, p, q and r satisfy s>0, t≥0, u≥0, p>0, q>0 and r≥0.

In addition, an inorganic compound not comprising lithium (Li), such as $MnO_2$, $V_2O_5$, $V_6O_{13}$, NiS and MoS, may be used in the anode.

Some embodiments of the present application further provide a preparation method of the electrochemical device, comprising the following steps: the solid electrolyte according to the embodiments of the present application, the cathode active materials and the conductive agent are sufficiently ground and physically mixed uniformly, then the uniformly mixed powder and the solid electrolyte in the above embodiment are placed in a cold pressing mold and pressed under the pressure of about 100 MPa to about 400 MPa by a cold pressing method to form a cathode-solid electrolyte double-layer sheet, an anode is placed on the surface of the double-layer sheet on the side of the solid electrolyte, the anode and the double-layer sheet are together placed in a cold pressing mold and pressed under the pressure of about 100 MPa to about 400 MPa by a cold pressing method to form an electrode assembly, and the electrode assembly is cut and packaged to complete the preparation of the electrochemical device.

Those skilled in the art will appreciate that while the above is illustrated with a lithium-ion battery, the electrochemical device of the present application further comprises any other suitable electrochemical device. The electrochemical device in the embodiments of the present application comprises any device that generates an electrochemical reaction without departing from the disclosure of the present application, and its specific examples comprise all kinds of primary batteries, secondary batteries, solar cells or capacitors. In particular, the electrochemical device is a lithium secondary battery, comprising a lithium metal secondary battery, a lithium-ion secondary battery, a lithium polymer secondary battery or a lithium-ion polymer secondary battery.

The use of the electrochemical device of the present application is not particularly limited and can be used for any purpose known in the art. In some embodiments of the present application, the electrochemical device of the present application may be used for, but not limited to, a notebook computer, a pen input computer, a mobile computer, an e-book player, a portable phone, a portable fax machine, a portable copy machine, a portable printer, a stereo headphone, a video recorder, a liquid crystal display television, a portable cleaner, a portable CD player, a mini disk, a transceiver, an electronic notebook, a calculator, a memory card, a portable recorder, a radio, a backup power, a motor, a car, a motorcycle, a motor bicycle, a bicycle, a lighting fixture, a toy, a game console, a clock, an electric tool, a flash lamp, a camera, a large household battery, a lithium-ion capacitor and the like.

The technical solution of the present application will be further described below in conjunction with the comparative examples and embodiments, but is not limited thereto. It will be understood by those skilled in the art that the preparation methods described in the present application are merely exemplary embodiments, and any modification or equivalent substitution of the technical solutions of the present application without departing from the scope of the technical solutions of the present application shall be comprised in the protection scope of the present application.

SPECIFIC EMBODIMENTS

Embodiment 1

Preparation of Lithium-Containing Transition Metal Sulfide $Li_{2-2a+b}Cd_{1+a}M_cGe_{1-d}S_4$ (LCMGS, M=Ga, a=0.25, b=0.2, c=0.2, d=0.2) Powder:

The elementary materials of lithium (Li) metal, cadmium (Cd) material, gallium (Ga) material and germanium (Ge) metal, and elementary sulfur (S) (according to the stoichiometric ratio of Li:Cd:Ga:Ge:S=1.7:1.25:0.2:0.8:4), were physically mixed uniformly, the formed mixture was placed in a vacuum quartz tube having a pressure of ($10^{-3}$) Pa therein, the mixture was heated in a tube furnace to a sintering temperature of 800° C. at a heating rate of 3° C./min, the sintering temperature was held for about 48 hours, the quartz tube was cooled to room temperature at a cooling rate of 5° C./h, and the obtained product was mashed and ground to obtain the lithium-containing transition metal sulfide (LCMGS) powder.

Preparation of Solid Electrolyte:

Cold pressing method: 300 mg of the above lithium-containing transition metal sulfide (LCMGS) powder was placed in a cold pressing mold, and subjected to cold-press molding under a pressure of 300 MPa to obtain a sheet-like solid electrolyte. The thickness of the solid electrolyte was 500 μm.

Preparation of Electrochemical Device:

The above lithium-containing transition metal sulfide (LCMGS) powder, lithium iron phosphate ($LiFePO_4$) and carbon nanotubes were sufficiently ground and physically mixed according to a mass ratio (LCMGS powder:lithium iron phosphate:carbon nanotubes=40%:50%:10%), then the formed mixture and the above solid electrolyte were together placed in a cold pressing mold and subjected to cold-press molding under a pressure of 400 MPa to form a cathode-solid electrolyte double-layer sheet; and then a lithium metal foil (anode) was placed on the surface of the double-layer sheet on the side of the solid electrolyte, the anode and the double-layer sheet were together placed in a cold pressing mold and pressed under a pressure of 200 MPa to form an electrode assembly, and the electrode assembly was cut and packaged to obtain the electrochemical device (solid-state lithium-ion battery).

Embodiment 2

Preparation of Lithium-Containing Transition Metal Sulfide $Li_{2-2a+b}Cd_{1+a}M_cGe_{1-d}S_4$ (LCMGS, M=Ga, a=0.25, b=0.2, c=0.2, d=0.2) Powder:

The binary materials of lithium sulfide ($Li_2S$), cadmium sulfide (CdS), digallium trisulfide ($Ga_2S_3$) and germanium disulfide ($GeS_2$) (according to the stoichiometric ratio of Li:Cd:M:Ge:S=1.7:1.25:0.2:0.8:4) were physically mixed uniformly, the formed mixture was placed in a vacuum quartz tube having a pressure of ($10^{-3}$) Pa therein, the mixture was heated in a tube furnace to a sintering temperature of 800° C. at a heating rate of 3° C./min, the sintering temperature was held for about 48 hours, the quartz tube was cooled to room temperature at a cooling rate of 5° C./h, and the obtained product was mashed and ground to obtain the lithium-containing transition metal sulfide (LCMGS) powder.

Preparation of Solid Electrolyte:

The preparation method was the same as that in Embodiment 1.

Preparation of Electrochemical Device:

The preparation method was the same as that in Embodiment 1.

Embodiment 3

Preparation of Lithium-Containing Transition Metal Sulfide (LCMGS) Powder:

The preparation method was the same as that in Embodiment 1. The difference was that in Embodiment 3, the heating rate was 0.1° C./min, the sintering temperature was 600° C., the sintering temperature was held for 96 hours, and the quartz tube was cooled to room temperature at the cooling rate of 1° C./h.

Preparation of Solid Electrolyte:

The preparation method was the same as that in Embodiment 1.

Preparation of Electrochemical Device:

The preparation method was the same as that in Embodiment 1.

Embodiment 4

Preparation of Lithium-Containing Transition Metal Sulfide (LCMGS) Powder:

The preparation method was the same as that in Embodiment 1. The difference was that in Embodiment 4, the heating rate was 10° C./min, the sintering temperature was 900° C., the sintering temperature was held for 24 hours, and the quartz tube was cooled to room temperature at the cooling rate of 10° C./h.

Preparation of Solid Electrolyte:

The preparation method was the same as that in Embodiment 1.

Preparation of Electrochemical Device:

The preparation method was the same as that in Embodiment 1.

Embodiment 5

Preparation of Lithium-Containing Transition Metal Sulfide (LCMGS) Powder:

The preparation method was the same as that in Embodiment 1.

Preparation of Solid Electrolyte:

Solution casting method: polyvinylidene fluoride (PVDF) and a N-methylpyrrolidone (NMP) solvent were formulated into a solution according to a mass ratio of 1:10, and lithium-containing transition metal sulfide (LCMGS) powder and lithium bis(trifluoromethylsulfonyl)imide (LiN(SO$_2$CF$_3$)$_2$) were added into the above solution according to a mass ratio (LCMGS powder:polyvinylidene fluoride:lithium bis(trifluoromethylsulfonyl)imide=60%:5%:35%), and subjected to stirring and ultrasonic dispersion to obtain uniformly mixed slurry; and then, the slurry was uniformly applied onto a glass plate, dried at 60° C. for 24 hours, and vacuum-dried at 60° C. for 24 hours to obtain the solid electrolyte. The thickness of the solid electrolyte was 50 to 150 μm.

Preparation of Electrochemical Device:

The preparation method was the same as that in Embodiment 1.

Embodiment 6

Preparation of Lithium-Containing Transition Metal Sulfide (LCMGS) Powder:

The preparation method was the same as that in Embodiment 1. The difference was that in the $Li_{2-2a+b}Cd_{1+a}M_cGe_{1-d}S_4$ (LCMGS) powder, M was silicon (Si), and the parameters of the chemical dose were a=0.25, b=0, c=0.2, and d=0.2, respectively.

Preparation of Solid Electrolyte:

The preparation method was the same as that in Embodiment 1.

Preparation of Electrochemical Device:

The preparation method was the same as that in Embodiment 1.

Embodiment 7

Preparation of Lithium-Containing Transition Metal Sulfide (LCMGS) Powder:

The preparation method was the same as that in Embodiment 1. The difference was that in the $Li_{2-2a+b}Cd_{1+a}M_cGe_{1-d}S_4$ (LCMGS) powder, the parameters of the chemical dose were a=0.25, b=0, c=0, and d=0, respectively.

Preparation of Solid Electrolyte:

The preparation method was the same as that in Embodiment 1.

Preparation of Electrochemical Device:

The preparation method was the same as that in Embodiment 1.

Comparative Example 1

Preparation of $Li_{10}GeP_2S_{12}$ (LGPS) Powder:

The binary materials of lithium sulfide ($Li_2S$), strontium disulfide ($GeS_2$) and phosphorus pentasulfide ($P_2S_5$) (according to the stoichiometric ratio of $Li_{10}GeP_2S_{12}$ provided in "A lithium superionic conductor, Kamaya et al., 2011", i.e., Li:Ge:P:S=10:1:2:12), were ball-milled and mixed uniformly, then the formed mixture was placed in a vacuum quartz tube, then the mixture was heated in a tube furnace at a heating rate of 3° C./min to the sintering temperature of 550° C., the sintering temperature was held for about 8 hours, then the quartz tube was cooled to room temperature at a cooling rate of 5° C./h, and the obtained product was mashed and ground to obtain the $Li_{10}GeP_2S_{12}$ (LGPS) powder.

Preparation of Solid Electrolyte:

Cold pressing method: 300 mg of the above $Li_{10}GeP_2S_{12}$ (LGPS) powder was placed in a cold pressing mold, and subjected to cold-press molding under a pressure of 300 MPa to obtain a sheet-like solid electrolyte. The thickness of the solid electrolyte was 300 μm.

Comparative Example 2

Preparation of Lithium-Containing Transition Metal Sulfide (LCMGS) Powder:

The preparation method was the same as that in Embodiment 1. The difference was that in Comparative Example 2, the sintering temperature was 300° C.

Comparative Example 3

Preparation of Lithium-Containing Transition Metal Sulfide (LCMGS) Powder:

The preparation method was the same as that in Embodiment 1. The difference was that in Comparative Example 3, the sintering temperature was 1100° C.

Comparative Example 4

Preparation of Lithium-Containing Transition Metal Sulfide (LCMGS) Powder:

The preparation method was the same as that in Embodiment 1. The difference was that in the $Li_{2-2a+b}Cd_{1+a}M_cGe_{1-d}S_4$ (LCMGS) powder, the parameters of the chemical dose were a=0.4, b=0, c=0, and d=0, respectively.

Comparative Example 5

Preparation of Lithium-Containing Transition Metal Sulfide (LCMGS) Powder:

The preparation method was the same as that in Embodiment 1. The parameters of the chemical dose were a=0.25, b=0.3, c=0.3, and d=0.3, respectively.

After the finished products of the compound material powder, the solid electrolyte and the solid-state lithium-ion battery of the above embodiments and comparative examples were completed, the compound powders prepared in Comparative Examples 2 to 3 and Embodiments 1 to 4 were subjected to an X-ray diffraction (XRD) test; the solid electrolytes prepared in Comparative Example 1 and Embodiments 1 to 7 were subjected to an ionic conductivity test; and the electrochemical devices prepared in Embodiments 1 to 7 were subjected to a battery capacity test.

X-Ray Diffraction Test:

An X-ray diffraction tester (recommended model and manufacturer) was adopted, and test conditions were set as follows: Cu $K_\alpha$ radiation (λ=1.5418 Å), operating current 250 mA, continuous scanning, operating voltage 40 kV, scanning range 2θ 10° to 70°, step length 0.1°, and scanning speed 0.2 sec/step. The prepared sample powder was subjected to a diffraction test to confirm the sample powder, and the sample powder obtained in Embodiment 1 was further subjected to a repeated diffraction test after being placed in an atmospheric environment (25° C., relative humidity<50%) for three days. The XRD diffraction patterns of the sample powder at the completion of preparation and three days after being placed in the atmospheric environment were recorded, and it was determined whether the test sample crystal was decomposed by water absorption or not based on the XRD diffraction pattern.

Ionic Conductivity Test:

The solid electrolyte to be tested was sandwiched between two stainless steel sheets (SUS304), the solid electrolyte sample was placed in an electrochemical workstation (CHI604E, Shanghai Chenhua (CH Instruments)) and subjected to a scanning test under the condition of an applied voltage of 10 mV within a frequency range of $10^6$ to $10^{-2}$ Hz, and the ionic conductivity was recorded.

Battery Capacity Test:

The electrochemical device (lithium-ion battery) to be tested was allowed to stand in an environment of 25±3° C. for 30 minutes, charged with constant current at a rate of 0.2 C or 0.05 C to a voltage of 3.75 V (rated voltage), and then discharged at a rate of 0.2 C or 0.05 C to 2.75 V. Finally, the first charge/discharge capacities were recorded (in the embodiments, the specific capacity of the cathode active material $LiFePO_4$ was based on 170 mAh/g).

Lithium-ion battery charge specific capacity=charge capacity/weight of the cathode active material.

Lithium-ion battery discharge specific capacity=discharge capacity/weight of the cathode active material.

The experimental parameters and measurement results of the X-ray diffraction test and the ion conductivity test of some embodiments and some comparative examples are shown in Table 1 below.

TABLE 1

| Sample | Material Source | Material Prepared | Heating Rate (° C./min) | Sintering Temperature (° C.) | Holding Time (h) |
|---|---|---|---|---|---|
| Comparative Example 1 | Binary | $Li_{10}GeP_2S_{12}$ | 3 | 550 | 8 |
| Comparative Example 2 | Elementary | $Li_{1.7}Cd_{1.25}Ga_{0.2}Ge_{0.8}S_4$ | 3 | 300 | 48 |
| Comparative Example 3 | Elementary | $Li_{1.7}Cd_{1.25}Ga_{0.2}Ge_{0.8}S_4$ | 3 | 1100 | 48 |
| Comparative Example 4 | Elementary | $Li_{1.2}Cd_{1.4}GeS_4$ | 3 | 800 | 48 |
| Comparative Example 5 | Elementary | $Li_{1.8}Cd_{1.25}Ga_{0.3}Ge_{0.7}S_4$ | 3 | 800 | 48 |
| Embodiment 1 | Elementary | $Li_{1.7}Cd_{1.25}Ga_{0.2}Ge_{0.8}S_4$ | 3 | 800 | 48 |
| Embodiment 2 | Binary | $Li_{1.7}Cd_{1.25}Ga_{0.2}Ge_{0.8}S_4$ | 3 | 800 | 48 |
| Embodiment 3 | Elementary | $Li_{1.7}Cd_{1.25}Ga_{0.2}Ge_{0.8}S_4$ | 0.1 | 600 | 96 |
| Embodiment 4 | Elementary | $Li_{1.7}Cd_{1.25}Ga_{0.2}Ge_{0.8}S_4$ | 10 | 900 | 24 |
| Embodiment 5 | Elementary | $Li_{1.7}Cd_{1.25}Ga_{0.2}Ge_{0.8}S_4$ | 3 | 800 | 48 |
| Embodiment 6 | Elementary | $Li_{1.5}Cd_{1.25}Si_{0.2}Ge_{0.8}S_4$ | 3 | 800 | 48 |
| Embodiment 7 | Elementary | $Li_{1.5}Cd_{1.25}GeS_4$ | 3 | 800 | 48 |

TABLE 1-continued

| Sample | Cooling Rate (° C./min) | Whether Pure Phase | Whether Absorb Moisture After Three Days in Atmospheric Environment | Preparation Method of Solid Electrolyte | Ionic Conductivity (S/cm) |
|---|---|---|---|---|---|
| Comparative Example 1 | 5 | Yes | Yes | Cold pressing | $1.5 \times 10^{-3}$ |
| Comparative Example 2 | 5 | No | \ | \ | \ |
| Comparative Example 3 | 5 | No | \ | \ | \ |
| Comparative Example 4 | 5 | No | \ | \ | \ |
| Comparative Example 5 | 5 | No | \ | \ | \ |
| Embodiment 1 | 5 | Yes | No | Cold pressing | $1.5 \times 10^{-4}$ |
| Embodiment 2 | 5 | Yes | No | Cold pressing | $1.1 \times 10^{-4}$ |
| Embodiment 3 | 1 | Yes | No | Cold pressing | $7.4 \times 10^{-5}$ |
| Embodiment 4 | 10 | Yes | No | Cold pressing | $1.1 \times 10^{-4}$ |
| Embodiment 5 | 5 | Yes | No | Solution casting | $1.7 \times 10^{-4}$ |
| Embodiment 6 | 5 | \ | \ | Cold pressing | $1.1 \times 10^{-5}$ |
| Embodiment 7 | 5 | \ | \ | Cold pressing | $8.6 \times 10^{-6}$ |

By comparing Comparative Examples 2 and 3 and Embodiments 1, 2, 3 and 4 by Table 1 and FIG. 2 to FIG. 7, it can be clearly seen that both elemental raw materials and binary compound raw materials can be used for solid phase synthesis of LCMGS materials, the heating rate during the synthesis may be adjusted within a range of about 0.1° C./min to about 10° C./min, and the sintering temperature, holding time and cooling rate may be respectively adjusted within the ranges of about 600° C. to about 1000° C., about 24 hours to about 96 hours and about 1° C./h to about 10° C./h, showing great flexibility. FIG. 2 to FIG. 5 are respectively X-ray diffraction patterns of the lithium-containing transition metal sulfide (LCMGS) synthesized in Embodiments 1 to 4 of the present application. As shown in FIG. 2 to FIG. 5, the lithium-containing transition metal sulfide (LCMGS) powder synthesized in Embodiments 1 to 4 has higher crystallinity and sharp XRD peak position, and there is substantially no impurity peak position of the raw material in the XRD pattern, so the purity is high. In contrast, as shown in Table 1, the parameter ratios of the chemical dose in the $Li_{2-2a+b}Cd_{1+a}M_cGe_{1-d}S_4$ (LCMGS) powders in Comparative Examples 4 and 5 are not within the range of the embodiments of the present application ($0<a\leq0.25$, $0\leq b\leq0.2$, $0\leq c\leq0.2$, and $0\leq d\leq0.2$), and a single pure phase of the lithium-containing transition metal sulfide (LCMGS) as in the embodiments of the present application could not be obtained.

Figure 6:
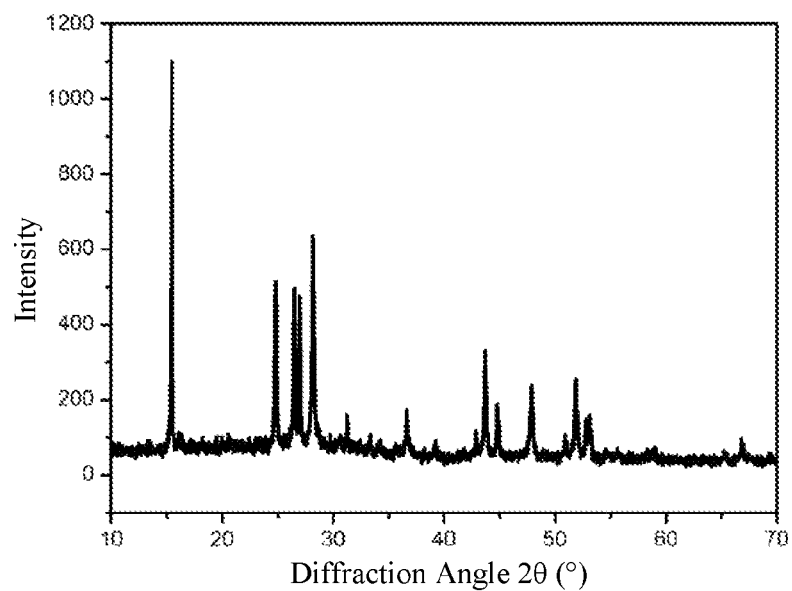
FIG. 6 is an X-ray diffraction pattern of a lithium-containing transition metal sulfide (LCMGS) synthesized in Comparative Example 2.
Figure 7:
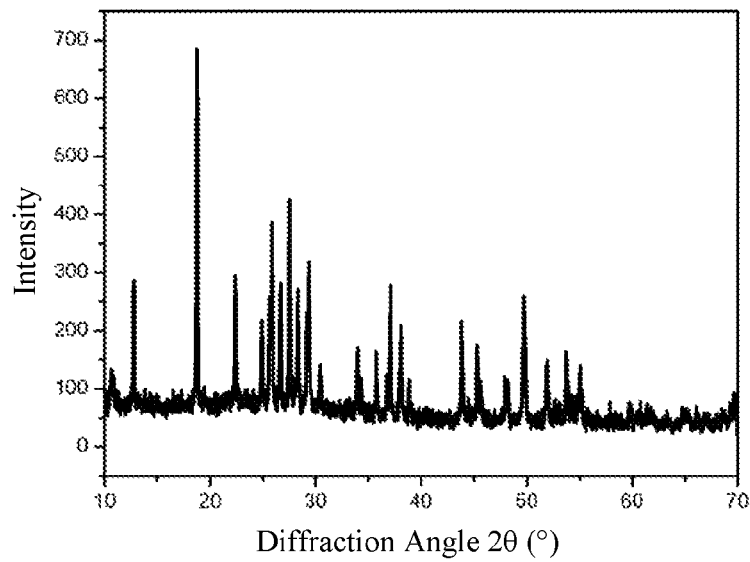
FIG. 7 is an X-ray diffraction pattern of a lithium-containing transition metal sulfide (LCMGS) synthesized in Comparative Example 3.

FIG. 6 and FIG. 7 are respectively X-ray diffraction patterns of the lithium-containing transition metal sulfide (LCMGS) synthesized in Comparative Examples 2 and 3. A too low or too high sintering temperature (300° C. or 1100° C.) may cause a problem that the solid phase reaction does not occur or a product decomposes. As shown in FIG. 6, the X-ray diffraction pattern of the product obtained in Comparative Example 2 contained a large amount of binary material phase. Since the solid phase reaction process involves the breaking of old bonds and the formation of new bonds, several intermediate phase reactions will be experienced in the middle. Each reaction has its corresponding Arrhenius activation energy. When the sintering temperature is too low, the system energy does not reach the energy required for reactant molecules to change from the normal state to the active state, and the reaction cannot proceed smoothly. When the temperature is too high, as shown in FIG. 7, the sintering temperature in Comparative Example 3 is as high as 1100° C., and the obtained product comprises impurities of binary materials such as cadmium sulfide (CdS) in addition to the lithium-containing transition metal sulfide (LCMGS), causing the decomposition of LCMGS due to the too high temperature.

Figure 8:
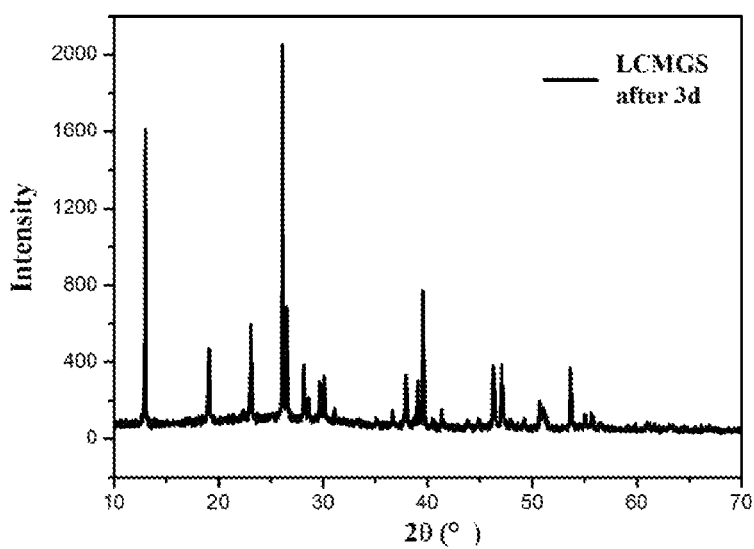
FIG. 8 is an X-ray diffraction pattern of the lithium-containing transition metal sulfide (LCMGS) synthesized in Embodiment 1 after being placed in a normal atmospheric environment (25° C., relative humidity <50%) for three days.

By comparing Comparative Example 1 with Embodiments 1 to 7, it can be clearly seen that the sulfur-phosphorus compound (LGPS) absorbed water severely after being placed for three days in an atmospheric environment, and at the same time, continuously generated malodorous gas such as $H_2S$. The LCMGS provided by the present invention had significantly enhanced chemical stability, and after the material was placed in an atmospheric environment (25° C., relative humidity<50%) for three days, the properties of the material did not change significantly. FIG. 8 is an X-ray diffraction pattern of the lithium-containing transition metal sulfide (LCMGS) synthesized in Embodiment 1 after being placed in a normal atmospheric environment (25° C., relative humidity <50%) for three days. As shown in FIG. 8, the lithium-containing transition metal sulfide (LCMGS) of the embodiments of the present application has no significant change in the X-ray diffraction pattern after being placed in a normal atmospheric environment (25° C., relative humidity<50%) for three days, indicating that the lithium-containing transition metal sulfide (LCMGS) can maintain its crystal pure phase and has high chemical stability in the atmospheric environment.

Furthermore, according to the ionic conductivity of each sample powder of Comparative Example 1 and Embodiments 1 to 7 in Table 1, the ionic conductivity of the LGPS material synthesized in Comparative Example 1 is about $1.5\times10^{-3}$ S/cm, which is slightly less than the value reported in the literature (12 mS/cm). This may be caused by different operating methods during material preparation. In addition, the lithium-containing transition metal sulfide (LCMGS) in Embodiments 1 to 7 still has certain Li$^+$ conductivity, where the ionic conductivity of the lithium-containing transition metal sulfide (LCMGS) in each of the embodiments is maintained at about $10^{-6}$ S/cm to about $10^{-4}$ S/cm.

The experimental parameters and measurement results of the battery capacity test of some embodiments are shown in Table 2 below.

electrolyte comprises a lithium-containing transition metal sulfide (LCMGS) material having a thio-LISICON crystal structure, and the lithium-containing transition metal sulfide (LCMGS) material has the ionic conductivity at room temperature of $10^{-6}$ to $10^{-4}$ S/cm, and also has the characteristics of mild preparation conditions, easy control and low cost. The electrochemical device assembled by the solid electrolyte in the embodiments of the present application exhibits good stability and also has certain electrochemical properties.

TABLE 2

| Sample | Material Source | Material Prepared | Heating Rate (° C./min) | Sintering Temperature (° C.) | Preparation Method of Solid Electrolyte | 0.05 C Charge Specific Capacity (mAh/g) | 0.05 C Discharge Specific Capacity (mAh/g) | 0.2 C Charge Specific Capacity (mAh/g) | 0.2 C Discharge Specific Capacity (mAh/g) |
|---|---|---|---|---|---|---|---|---|---|
| Embodiment 1 | Elementary | $Li_{1.6}Cd_{1.25}Ga_{0.1}Ge_{0.9}S_4$ | 3 | 800 | Cold pressing | 126.7 | 94.3 | 54.4 | 35.8 |
| Embodiment 2 | Binary | $Li_{1.6}Cd_{1.25}Ga_{0.1}Ge_{0.9}S_4$ | 3 | 800 | Cold pressing | 124.2 | 95.0 | 49.8 | 30.9 |
| Embodiment 3 | Elementary | $Li_{1.6}Cd_{1.25}Ga_{0.1}Ge_{0.9}S_4$ | 0.1 | 600 | Cold pressing | 120.6 | 88.3 | 46.7 | 28.2 |
| Embodiment 4 | Elementary | $Li_{1.6}Cd_{1.25}Ga_{0.1}Ge_{0.9}S_4$ | 10 | 900 | Cold pressing | 118.3 | 87.6 | 49.2 | 29.7 |
| Embodiment 5 | Elementary | $Li_{1.6}Cd_{1.25}Ga_{0.1}Ge_{0.9}S_4$ | 3 | 800 | Solution casting | 129.8 | 94.1 | 58.1 | 39.6 |
| Embodiment 6 | Elementary | $Li_{1.5}Cd_{1.25}Si_{0.1}Ge_{0.9}S_4$ | 3 | 800 | Cold pressing | 94.1 | 56.6 | 32.6 | 17.4 |
| Embodiment 7 | Elementary | $Li_{1.5}Cd_{1.25}GeS_4$ | 3 | 800 | Cold pressing | 92.5 | 56.2 | 30.1 | 15.2 |

According to the battery capacity test results of the electrochemical device prepared from the lithium-containing transition metal sulfide (LCMGS) of Embodiments 1 to 7 in Table 2, it can be seen that the electrochemical device in the embodiments of the present application has the charge specific capacity of about 100 mAh/g (converted into the specific capacity of the cathode active material LiFePO$_4$) at the charge/discharge rate of 0.05 C, and also has the charge specific capacity of about 50 mAh/g at the charge/discharge rate of 0.2 C. It can be seen from the above that the electrochemical device prepared from the lithium-containing transition metal sulfide (LCMGS), provided by the embodiments of the present application, has certain electrochemical properties.

Figure 9:
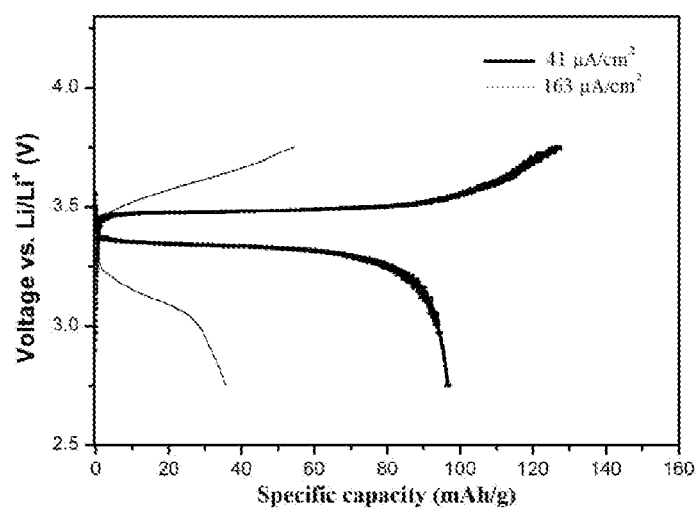
FIG. 9 is a specific capacity vs charge/discharge voltage chart of a solid-state lithium-ion battery of Embodiment 1.

FIG. 9 is a specific capacity vs charge/discharge voltage curve chart of a solid-state lithium-ion battery of Embodiment 1. As shown in FIG. 9, when the current is 0.05 C (41 µA/cm$^2$) in the voltage range of 2.75 to 3.75 V, the charge/discharge capacities of the solid-state lithium-ion battery prepared in Embodiment 1 are respectively 1.216 and 0.905 mAh (converted into the specific capacity of the cathode active material LiFePO$_4$, 126.7 and 94.3 mAh/g respectively); and when the current is 0.2 C (163 µA/cm$^2$), the first cycle charge/discharge capacities of the solid-state lithium-ion battery are respectively 0.522 and 0.344 mAh, (converted into the specific capacity of the active material LiFePO$_4$, 54.4 and 35.8 mAh/g respectively), which are significantly smaller as compared with the charge/discharge capacities at a current of 0.05 C and 0.2 C. This is mainly caused by the severe polarization of the battery under a large current.

It should be understood from the description of the above embodiments and comparative examples of the present application that the present application provides a novel solid electrolyte and a synthesis method thereof. The solid References to "embodiments", "some embodiments", "an embodiment", "another example", "examples", "specific examples" or "some examples" in the specification of the present application mean that at least one embodiment or example of the embodiments of the present application comprises the specific features, structures, materials or characteristics described in the embodiment or example. Therefore, descriptions appearing throughout the specification, such as "in some embodiments", "in the embodiments", "in an embodiment", "in another example", "in an example", "in a particular example" or "examples", are not necessarily referring to the same embodiments or examples in the embodiments of the present application. Furthermore, the particular features, structures, materials or characteristics herein may be combined in any suitable manner in one or more embodiments or examples.

The above description summarizes the features of several embodiments, which will enable those of ordinary skill in the art to understand the various aspects of the present application. Those of ordinary skill in the art can readily use the present application as a basis for designing or modifying other compositions to achieve the same objectives and/or the same advantages as the embodiments herein. It is also to be understood by those of ordinary skill in the art that these equal examples do not depart from the spirit and scope of the present application, and it is possible to make various changes, substitutions and modifications to the present application without departing from the spirit and scope of the present application. Although the methods disclosed herein have been described with reference to the specific operations that are carried out in a specific order, it should be understood that these operations can be combined, subdivided, or reordered to form an equivalent method without departing from the teachings of the present application.

Therefore, the order and grouping of the operations are not a limitation to the present application unless specifically indicated herein.

What is claimed is:

1. A solid electrolyte, comprising a lithium-containing transition metal sulfide being represented by the chemical formula of $Li_{2-2a+b}Cd_{1+a}M_cGe_{1-d}S_4$, wherein a=0.25, 0≤b≤0.2, 0<c≤0.2, 0≤d≤0.2 and M is selected from the group consisting of Al, Ga, In, Si, Sn and a combination thereof.

2. The solid electrolyte according to claim 1, wherein the lithium-containing transition metal sulfide belongs to an orthorhombic system and has a thio-LISICON crystal structure, and the basic constituent unit of the thio-LISICON crystal structure comprises tetrahedral structural units of $LiS_4$, $CdS_4$, $MS_4$ and $GeS_4$.

3. The solid electrolyte according to claim 1, further comprising a binder and a lithium salt, wherein the binder is selected from the group consisting of polyvinylidene fluoride, vinylidene fluoride-hexafluoropropylene copolymer, polyamide, polyacrylonitrile, polyacrylate ester, polyacrylic acid, polyacrylate salt, sodium carboxymethyl cellulose, polyvinylpyrrolidone, polyvinyl ether, polymethyl methacrylate, polytetrafluoroethylene, polyhexafluoropropylene, styrene-butadiene rubber and a combination thereof, and the lithium salt is selected from the group consisting of lithium perchlorate ($LiClO_4$), lithium hexafluorophosphate ($LiPF_6$), lithium hexafluoroarsenate ($LiAsF_6$), lithium tetrafluoroborate ($LiBF_4$), lithium tetraphenylborate ($LiB(C_6H_5)_4$), lithium methanesulfonate ($LiCH_3SO_3$), lithium trifluoromethanesulfonate ($LiCF_3SO_3$), lithium bis(trifluoromethylsulfonyl)imide ($LiN(SO_2CF_3)_2$), lithium tris(trifluoromethanesulfonyl)methide ($LiC(SO_2CF_3)_3$), lithium hexafluorosilicate ($LiSiF_6$), lithium bis(oxalate)borate (LiBOB), lithium difluoroborate ($LiF_2OB$) and a combination thereof.

4. The solid electrolyte according to claim 1, wherein the ionic conductivity of the lithium-containing transition metal sulfide is $10^{-6}$ S/cm to $10^{-4}$ S/cm with a variance of ±10% of the numerical value.

5. A method for preparing a solid electrolyte, comprising:
mixing a Li-containing material, a Cd-containing material, an M-containing material, a Ge-containing material and an S-containing material according to a stoichiometric ratio of $Li_{2-2a+b}Cd_{1+a}M_cGe_{1-d}S_4$, to form a mixture, wherein M is selected from the group consisting of Al, Ga In, Si, Sn and a combination thereof, wherein a=0.25, 0≤b≤0.2, 0<c≤0.2, and 0≤d≤0.2;
heating the mixture to a solid phase reaction critical temperature, and then cooling to room temperature to obtain a lithium-containing transition metal sulfide; and
forming the solid electrolyte using the lithium-containing transition metal sulfide.

6. The method according to claim 5, wherein the step of heating the mixture to a solid phase reaction critical temperature comprises heating the mixture to 600° C. to 1000° C. with a variance of ±10% of the numerical value.

7. The method according to claim 5, wherein the step of forming the solid electrolyte using the lithium-containing transition metal sulfide comprises:
placing the lithium-containing transition metal sulfide in a cold pressing mold; and
cold-pressing the lithium-containing transition metal sulfide to form the solid electrolyte.

8. The method according to claim 5, wherein the step of forming the solid electrolyte using the lithium-containing transition metal sulfide comprises:
adding a binder into a solvent to prepare a solution, wherein the binder is selected from the group consisting of polyvinylidene fluoride, a vinylidene fluoride-hexafluoropropylene copolymer, polyamide, polyacrylonitrile, polyacrylate ester, polyacrylic acid, polyacrylate salt, sodium carboxymethyl cellulose, polyvinylpyrrolidone, polyvinyl ether, polymethyl methacrylate, polytetrafluoroethylene, polyhexafluoropropylene, styrene-butadiene rubber and a combination thereof;
adding the lithium-containing transition metal sulfide and a lithium salt into the solution, and stirring uniformly to form mixed slurry, wherein the lithium salt is selected from the group consisting of lithium perchlorate ($LiClO_4$), lithium hexafluorophosphate ($LiPF_6$), lithium hexafluoroarsenate ($LiAsF_6$), lithium tetrafluoroborate ($LiBF_4$), lithium tetraphenylborate ($LiB(C_6H_5)_4$), lithium methanesulfonate ($LiCH_3SO_3$), lithium trifluoromethanesulfonate ($LiCF_3SO_3$), lithium bis(trifluoromethylsulfonyl)imide ($LiN(SO_2CF_3)_2$), lithium tris(trifluoromethanesulfonyl)methide ($LiC(SO_2CF_3)_3$), lithium hexafluorosilicate ($LiSiF_6$), lithium bis(oxalate)borate (LiBOB), lithium difluoroborate ($LiF_2OB$) and a combination thereof; and
applying the mixed slurry onto a substrate, and then drying the mixed slurry to form the solid electrolyte.

9. An electrochemical device, comprising:
a cathode;
an anode; and
a solid electrolyte, wherein the solid electrolyte comprises a lithium-containing transition metal sulfide being represented by the chemical formula of $Li_{2-2a+b}Cd_{1+a}M_cGe_{1-d}S_4$, wherein a=0.25, 0≤b≤0.2, 0<c≤0.2, 0≤d≤0.2 and M is selected from the group consisting of Al, Ga, In, Si, Sn and a combination thereof.

10. The electrochemical device according to claim 9, wherein the lithium-containing transition metal sulfide belongs to an orthorhombic system and has a thio-LISICON crystal structure, and the basic constituent unit of the thio-LISICON crystal structure comprises tetrahedral structural units of $LiS_4$, $CdS_4$, $MS_4$ and $GeS_4$.

11. The electrochemical device according to claim 9, wherein the solid electrolyte further comprises a binder and a lithium salt, wherein the binder is selected from the group consisting of polyvinylidene fluoride, vinylidene fluoride-hexafluoropropylene copolymer, polyamide, polyacrylonitrile, polyacrylate ester, polyacrylic acid, polyacrylate salt, sodium carboxymethyl cellulose, polyvinylpyrrolidone, polyvinyl ether, polymethyl methacrylate, polytetrafluoroethylene, polyhexafluoropropylene, styrene-butadiene rubber and a combination thereof, and the lithium salt is selected from the group consisting of lithium perchlorate ($LiClO_4$), lithium hexafluorophosphate ($LiPF_6$), lithium hexafluoroarsenate ($LiAsF_6$), lithium tetrafluoroborate ($LiBF_4$), lithium tetraphenylborate ($LiB(C_6H_5)_4$), lithium methanesulfonate ($LiCH_3SO_3$), lithium trifluoromethanesulfonate ($LiCF_3SO_3$), lithium bis(trifluoromethylsulfonyl)imide ($LiN(SO_2CF_3)_2$), lithium tris(trifluoromethanesulfonyl)methide ($LiC(SO_2CF_3)_3$), lithium hexafluorosilicate ($LiSiF_6$), lithium bis(oxalate)borate (LiBOB), lithium difluoroborate ($LiF_2OB$) and a combination thereof.

12. The electrochemical device according to claim 9, wherein the ionic conductivity of the lithium-containing transition metal sulfide is $10^{-6}$ S/cm to $10^{-4}$ S/cm with a variance of ±10% of the numerical value.

13. An electronic device, comprising an electrochemical device, wherein the electrochemical device comprises:
a cathode;
an anode; and
a solid electrolyte, wherein the solid electrolyte comprises a lithium-containing transition metal sulfide being represented by the chemical formula of $Li_{2-2a+b}Cd_{1+a}M_cGe_{1-d}S_4$, wherein a=0.25, 0≤b≤0.2, 0<c≤0.2, 0≤d≤0.2 and M is selected from the group consisting of Al, Ga, In, Si, Sn and a combination thereof.

14. The electronic device according to claim 13, wherein the lithium-containing transition metal sulfide belongs to an orthorhombic system and has a thio-LISICON crystal structure, and the basic constituent unit of the thio-LISICON crystal structure comprises tetrahedral structural units of $LiS_4$, $CdS_4$, $MS_4$ and $GeS_4$.

15. The electronic device according to claim 13, wherein the solid electrolyte further comprises a binder and a lithium salt, wherein the binder is selected from the group consisting of polyvinylidene fluoride, vinylidene fluoride-hexafluoropropylene copolymer, polyamide, polyacrylonitrile, polyacrylate ester, polyacrylic acid, polyacrylate salt, sodium carboxymethyl cellulose, polyvinylpyrrolidone, polyvinyl ether, polymethyl methacrylate, polytetrafluoroethylene, polyhexafluoropropylene, styrene-butadiene rubber and a combination thereof, and the lithium salt is selected from the group consisting of lithium perchlorate ($LiClO_4$), lithium hexafluorophosphate ($LiPF_6$), lithium hexafluoroarsenate ($LiAsF_6$), lithium tetrafluoroborate ($LiBF_4$), lithium tetraphenylborate ($LiB(C_6H_5)_4$), lithium methanesulfonate ($LiCH_3SO_3$), lithium trifluoromethanesulfonate ($LiCF_3SO_3$), lithium bis(trifluoromethylsulfonyl)imide ($LiN(SO_2CF_3)_2$), lithium tris(trifluoromethanesulfonyl)methide ($LiC(SO_2CF_3)_3$), lithium hexafluorosilicate ($LiSiF_6$), lithium bis(oxalate)borate (LiBOB), lithium difluoroborate ($LiF_2OB$) and a combination thereof.

16. The electronic device according to claim 13, wherein the ionic conductivity of the lithium-containing transition metal sulfide is $10^{-6}$ S/cm to $10^{-4}$ S/cm with a variance of ±10% of the numerical value.

17. A solid electrolyte, comprising a lithium-containing transition metal sulfide being represented by the chemical formula of $Li_{2-2a+b}Cd_{1+a}M_cGe_{1-d}S_4$, wherein a=0.25, 0≤b≤0.2, 0<c≤0.2, 0≤d≤0.2 and M is selected from the group consisting of In, Si, and a combination thereof.

18. The solid electrolyte according to claim 17, wherein the lithium-containing transition metal sulfide belongs to an orthorhombic system and has a thio-LISICON crystal structure, and the basic constituent unit of the thio-LISICON crystal structure comprises tetrahedral structural units of $LiS_4$, $CdS_4$, $MS_4$ and $GeS_4$.

19. The solid electrolyte according to claim 17, further comprising a binder and a lithium salt, wherein the binder is selected from the group consisting of polyvinylidene fluoride, vinylidene fluoride-hexafluoropropylene copolymer, polyamide, polyacrylonitrile, polyacrylate ester, polyacrylic acid, polyacrylate salt, sodium carboxymethyl cellulose, polyvinylpyrrolidone, polyvinyl ether, polymethyl methacrylate, polytetrafluoroethylene, polyhexafluoropropylene, styrene-butadiene rubber and a combination thereof, and the lithium salt is selected from the group consisting of lithium perchlorate ($LiClO_4$), lithium hexafluorophosphate ($LiPF_6$), lithium hexafluoroarsenate ($LiAsF_6$), lithium tetrafluoroborate ($LiBF_4$), lithium tetraphenylborate ($LiB(C_6H_5)_4$), lithium methanesulfonate ($LiCH_3SO_3$), lithium trifluoromethanesulfonate ($LiCF_3SO_3$), lithium bis(trifluoromethylsulfonyl)imide ($LiN(SO_2CF_3)_2$), lithium tris(trifluoromethanesulfonyl)methide ($LiC(SO_2CF_3)_3$), lithium hexafluorosilicate ($LiSiF_6$), lithium bis(oxalate)borate (LiBOB), lithium difluoroborate ($LiF_2OB$) and a combination thereof.

20. The solid electrolyte according to claim 17, wherein the ionic conductivity of the lithium-containing transition metal sulfide is $10^{-6}$ S/cm to $10^{-4}$ S/cm with a variance of ±10% of the numerical value.

* * * * *